United States Patent [19]
Baker et al.

[11] Patent Number: 5,385,711
[45] Date of Patent: * Jan. 31, 1995

[54] ELECTROLYTIC CELL FOR GENERATING STERILIZATION SOLUTIONS HAVING INCREASED OZONE CONTENT

[75] Inventors: Forrest A. Baker, Albuquerque; Wesley L. Bradford, Los Alamos, both of N. Mex.

[73] Assignee: Los Alamos Technical Associates, Inc., Albuquerque, N. Mex.

[*] Notice: The portion of the term of this patent subsequent to May 31, 2011 has been disclaimed.

[21] Appl. No.: 200,146

[22] Filed: Feb. 23, 1994

Related U.S. Application Data

[63] Continuation of Ser. No. 857,731, Mar. 26, 1992, Pat. No. 5,316,740.

[51] Int. Cl.$^6$ .................. C01B 13/10; B01J 19/12
[52] U.S. Cl. ................ 422/186.07; 422/186; 204/176
[58] Field of Search ............... 422/186, 186.07; 204/176

[56] References Cited

U.S. PATENT DOCUMENTS

| | | | |
|---|---|---|---|
| 4,209,368 | 6/1980 | Coker et al. | 204/98 |
| 4,488,945 | 12/1984 | Spaziante | 204/95 |
| 4,541,989 | 9/1985 | Foller | 422/186.07 |
| 4,555,323 | 11/1985 | Collier | 204/258 |
| 5,154,895 | 10/1992 | Moon | 422/186.07 |
| 5,205,994 | 4/1993 | Sawamoto | 422/186.07 |

*Primary Examiner*—Donald P. Walsh
*Assistant Examiner*—Daniel Jenkins
*Attorney, Agent, or Firm*—McCubbrey, Bartels & Ward

[57] ABSTRACT

An electrolytic cell for generating a mixed oxidant that is rich in ozone is disclosed. The cell disassociates a brine solution to generate ozone and chlorine based oxidants. The improved cell design allows the ratio of ozone to the other oxidants to be optimized, thereby providing a more efficient sterilization solution. The ozone production is adjusted by adjusting the residence time of the brine solution in the cell and the orientation of the cell.

1 Claim, 4 Drawing Sheets

ELECTROLYTIC CELL FOR GENERATING STERILIZATION SOLUTIONS HAVING INCREASED OZONE CONTENT

This application is a continuation of application Ser. No. 07/857,731, issued Mar. 26, 1992, now U.S. Pat. No. 5,316,740.

FIELD OF THE INVENTION

The present invention relates to water sterilization equipment, and more particularly, to an electrolytic cell for generating oxidant solutions that include ozone.

BACKGROUND OF THE INVENTION

Maintaining the sterility of drinking water supplies is a major factor in reducing the health risks to the human population. While large metropolitan water systems can make use of highly toxic chlorine gas for sterilizing drinking water, such systems are impractical in remote locations which lack highly trained personnel and the equipment to maintain the systems. To be effective in rural settings, a system must be capable of running for long periods of time with little or no maintenance. In addition, the raw materials required by the system must be readily available.

Systems based on the electrolytic production of chlorine and ozone based germicidal agents are particularly attractive. These systems require only electricity and common salt as raw materials. One such system is described in U.S. Pat. No. 4,761,208 to Gram, et al. which is incorporated herein by reference. This system utilizes an electrolytical cell to generate a mixed stream of oxidants including chlorine compounds, ozone, and $H_2O_2$ from common salt. This oxidant stream may be added directly to the drinking water at a high dilution ratio, thereby sterilizing the drinking water without causing the water to become unpalatable. This system is particularly attractive because of its simplicity and long maintenance free operation time.

While this system represents a major improvement over the prior systems, it is less than optimal. For example, the most effective mixed oxidant stream has been found to be an oxidant stream in which the ratio of ozone and $H_2O_2$ to the chlorine based compounds is maximized. In addition to providing more effective sterilization, the ozone and $H_2O_2$ oxidants provide a more palatable drinking water supply.

Broadly, it is the object of the present invention to provide an improved mixed oxidant generating system.

It is a further object of the present invention to provide a mixed oxidant generating system with increased ratios of ozone to chorine based compounds.

These and other objects of the present invention will become apparent to those skilled in the art from the following detailed description of the invention and the accompanying drawings.

SUMMARY OF THE INVENTION

The present invention comprises an apparatus for generating a mixed oxidant stream including ozone, as well as chlorine based oxidants. The apparatus includes a flow chamber having two substantially planar walls which form the anode and cathode of an electrical circuit. A DC electric potential is maintained between the anode and cathode. An electrolytic solution is caused to flow between the anode and cathode surfaces. This stream is subsequently divided into cathode and anode streams. The anode stream provides the mixed oxidant stream in question. The flow rate through the apparatus determines the ratio of the various oxidants in the anode stream. This flow rate is adjusted with the aid of a sensor that measures a parameter which is correlated with ozone production to maintain optimum ozone production. For optimum ozone production to be obtained, the zone between the anode and cathode must be defined such that an electrochemical interaction zone bounded by the anode and cathode exists that has a shape such that electrolytic solution caused to flow through said interaction zone has substantially the same residence time in said interaction zone independent of the path taken through the interaction zone.

DETAILED DESCRIPTION OF THE INVENTION

Figure 1:
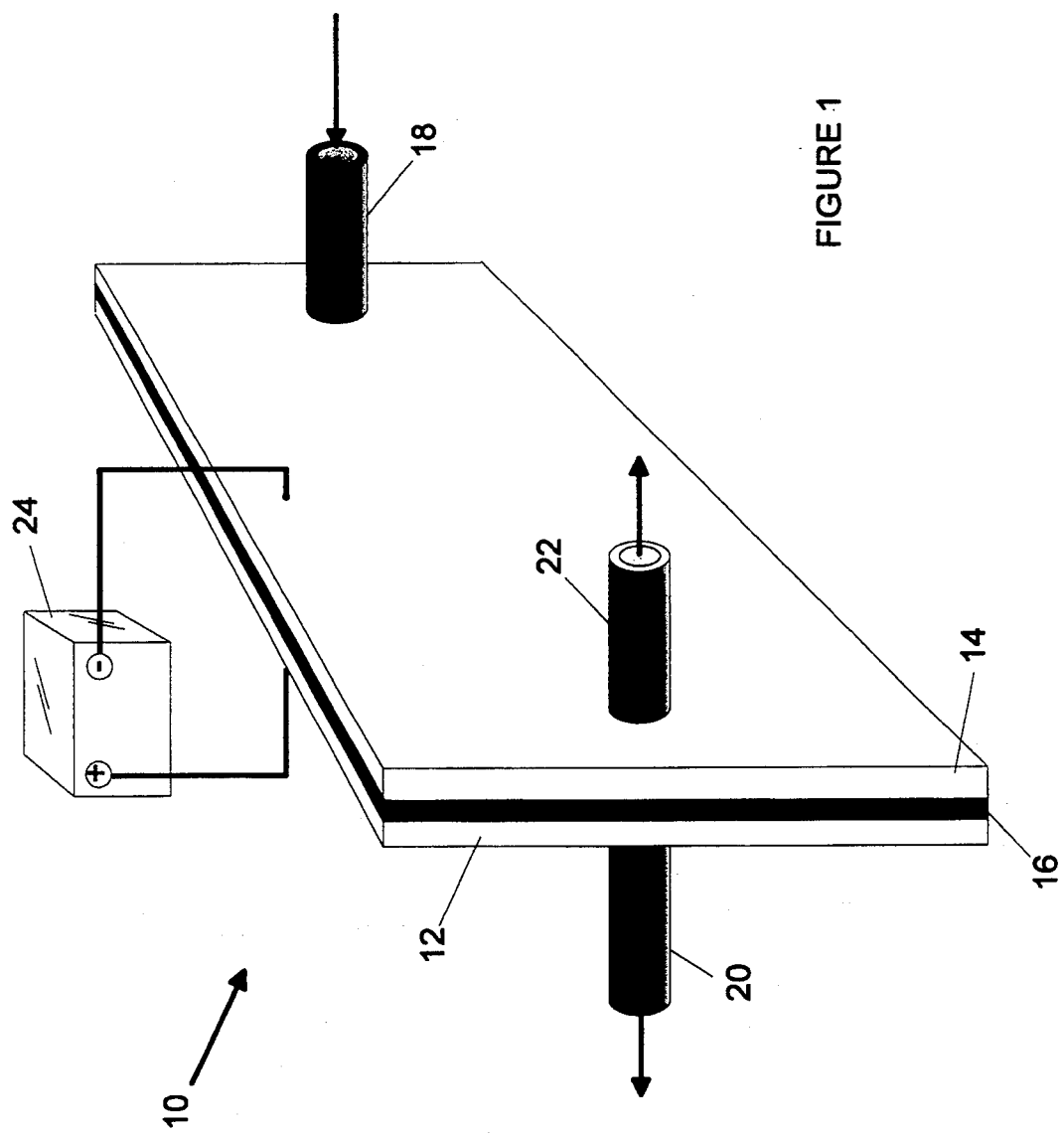
FIG. 1 is a prospective view of an electrolytic cell according to the present invention.
Figure 2:
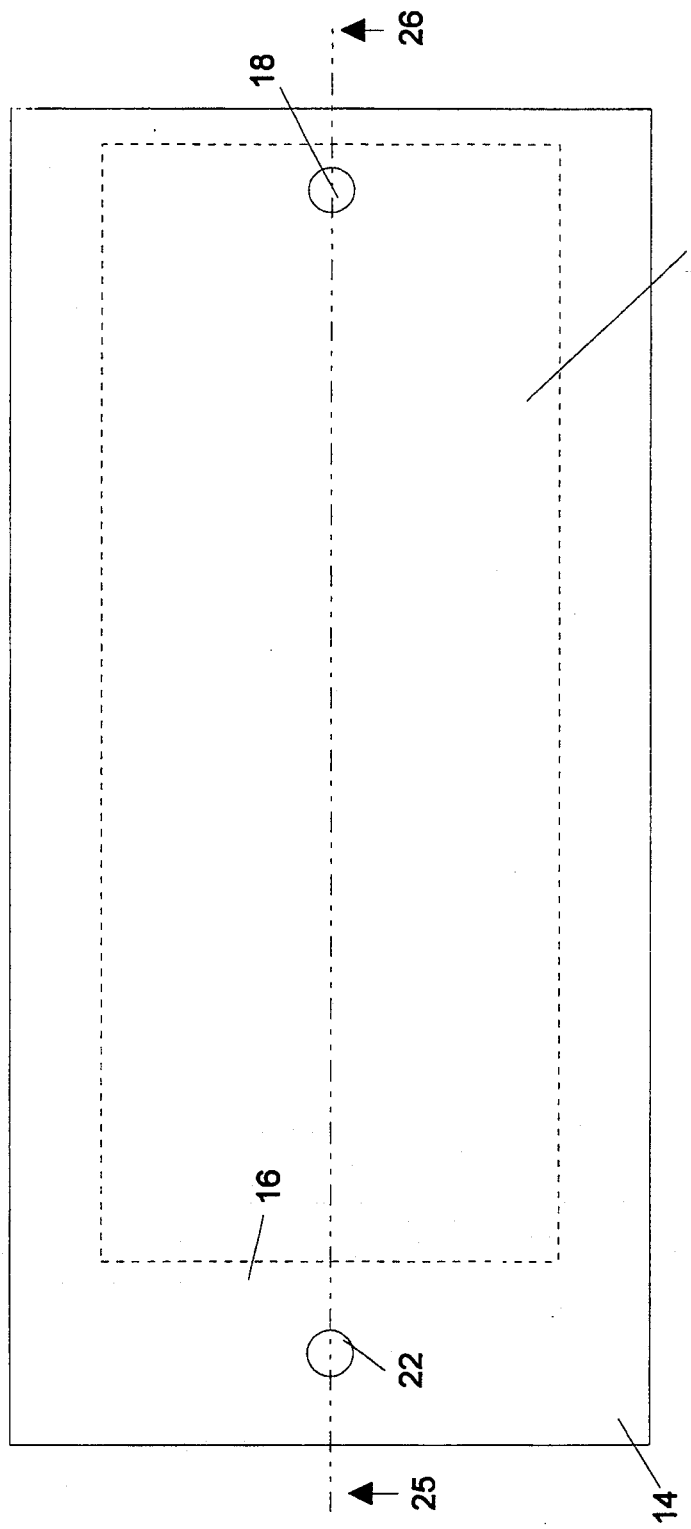
FIG. 2 is a side view of an electrolytic cell according to the present invention.
Figure 3:
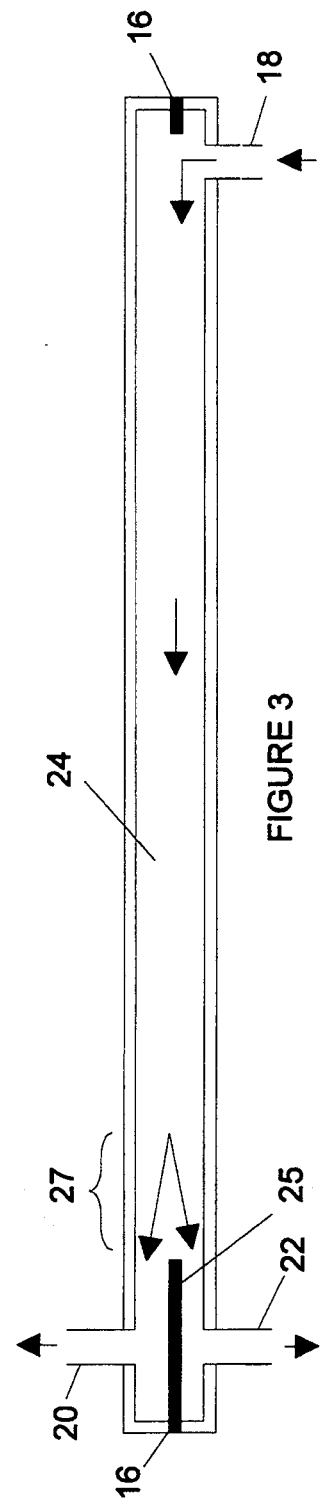
FIG. 3 is a cross-sectional view of an electrolytic cell according to the present invention.

The manner in which an electrolytic cell 10 according to the present invention operates can be more easily understood with references to FIGS. 1–3. Electrolytic cell 10 includes an anode 12 and a cathode 14 which are separated by an insulating gasket 16 thereby forming a flow chamber 24 through which a salt solution is passed. The salt solution is introduced through an input port 18 and exits through an anode port 20 and a cathode port 22. A DC voltage is maintained between anode 12 and cathode 14 with the aid of a power source 24. Anode 12 and cathode 14 are preferably constructed from titanium. In addition, anode 12 preferably includes a Group VIII metal for the reasons discussed below.

Referring to FIG. 3, the flow of salt solution is divided by an extension of gasket 25 into anode and cathode output streams which exit through anode port 20 and cathode port 22, respectively. The flow in chamber 24 is laminar in nature. As the salt solution traverse the chamber 24, the pH of the solution changes. The portion of the salt solution that is adjacent to anode 12 decreases in pH, while the portion of the salt solution that is adjacent to cathode 14 increases in pH.

Various oxidants are generated in the salt solution as the solution progresses through the electrolytic cell. The solution leaving the anode port includes ozone and various chlorine containing oxidants. This solution will be referred to as the anode stream in the following discussion. The solution leaving the cathode port will be referred to as the cathode stream. The division of the input stream from input port 18 into the anode and cathode streams is aided by an extension of gasket 16 which forms a flow separator 25. As will be explained in more detail below, the shape and location of separator 25 is a significant factor in the concentration of ozone in the anode stream.

The anode stream is added to the water supply to be sterilized. The anode stream is preferred because it contains higher concentrations of desired oxidants and because it has an acidic pH. Regulatory requirements governing drinking water dictate that the final drinking water supply be neutral or acidic. In addition, the germicidal effects of the mixed oxidants are increased in acidic environments.

The specific oxidants that are generated in the anode stream as it progresses through the cell depend on the pH of the solution at the corresponding point in the cell and on the material from which the anode is constructed. The concentrations of ozone produced in the electrolytic cell depend much more sensitively on these factors than do the concentrations of the chlorine based compounds. In particular, ozone is produced over a relatively narrow range of pH values. At pH values above the optimum, little ozone is produced. At pH values below the optimum, the ozone is converted to less effective compounds and radicals.

The ozone production is also dependent on the material from which the anode is constructed. In particular, it is found experimentally that ozone production is catalyzed by Group VIII metals such as platinum, iridium, rhodium, or ruthenium. In addition, these metals are highly resistant to corrosion and do not dissolve easily. Hence, the preferred embodiment of anode 12 in electrolytic cell 10 is constructed from titanium that has been plated with iridium. However, other combinations will be apparent to those skilled in the art. In addition, electrolytes other than NaCl may be used. A number of possible combinations of salts and materials are discussed in U.S. Pat. No. 4,761,208 discussed above.

In contrast, the production of the chlorine based oxidants is far less sensitive to pH and anode construction. It is this difference in sensitivity which is utilized in the present invention to provide increased ratios of ozone to chlorine based compounds. In principle, an operating parameter that effects ozone production can be altered until an ozone sensor in the anode stream indicates that optimum ozone production is being achieved. Alternatively, some other measurement that is related to the ozone production may be used in the servo loop.

For any given salt concentration and flow rate of the salt solution through the electrolytic cell, there is a narrow pH range in which ozone production will be maximized. Hence, either ozone production or pH may be used to run the servo loop. Since pH electrodes are inexpensive and reliable, a servo loop based on pH provides an attractive alternative to a servo loop based on ozone.

If optimum pH range is generated just before the salt solution reaches the location of separator 25, i.e., in region 27 shown in FIG. 3, the ozone production of electrolytic cell 10 will be optimized. If the optimum pH range is not obtained by the time the salt solution reaches region 27, too little ozone will be generated. If, on the other hand, the optimum pH range is reached well before the salt solution reaches region 27, the pH of the salt solution along the anode in region 27 will be significantly below the optimum pH. As a result, the ozone generated in the region of optimum pH will be lost in the below optimum pH conditions in region 27.

It should be noted that separator 25 is an electrical insulator. As a result, further electrolytic reactions of the salt solution at anode 12 and cathode 14 in the regions between the end of separator 25 and ports 20 and 22 are negligible. The anode stream effectively represents a sampling of the salt solution at the end of separator 25. As noted above, the ozone production is related to the pH of the electrolyte at the location of the separator. Hence, it is important that the shape of the separator be chosen such that the pH of the electrolyte at the anode surface is substantially constant along the edge of separator 25. If this condition is not met, the anode stream will be derived from regions of differing pH. Those regions that have pH's outside the optimum will contribute less ozone to the anode stream; hence, less than optimal ozone production will be obtained.

The pH at any point in the cell depends on the flow pattern of the electrolytic solution between input port 18 and the point in question. Consider the points located along the anode. As the electrolytic solution progresses through the electrolytic cell, the pH decreases as noted above. The amount of decrease will depend on the amount of time the electrolyte has spent in contact with the anode. This, in turn, is related to the transit time of the electrolyte from the point at which it encounters sufficient electric field to undergo significant electrochemical reactions to the point in question. Hence, the optimum shape for the edge of separator 25 is that which guarantees that fluid at each point along the edge of the separator has spend substantially the same time in contact with the anode in that portion of the flow chamber in which significant electrochemical interactions take place, i.e., interactions that significantly change the pH of the electrolyte.

Figure 4:
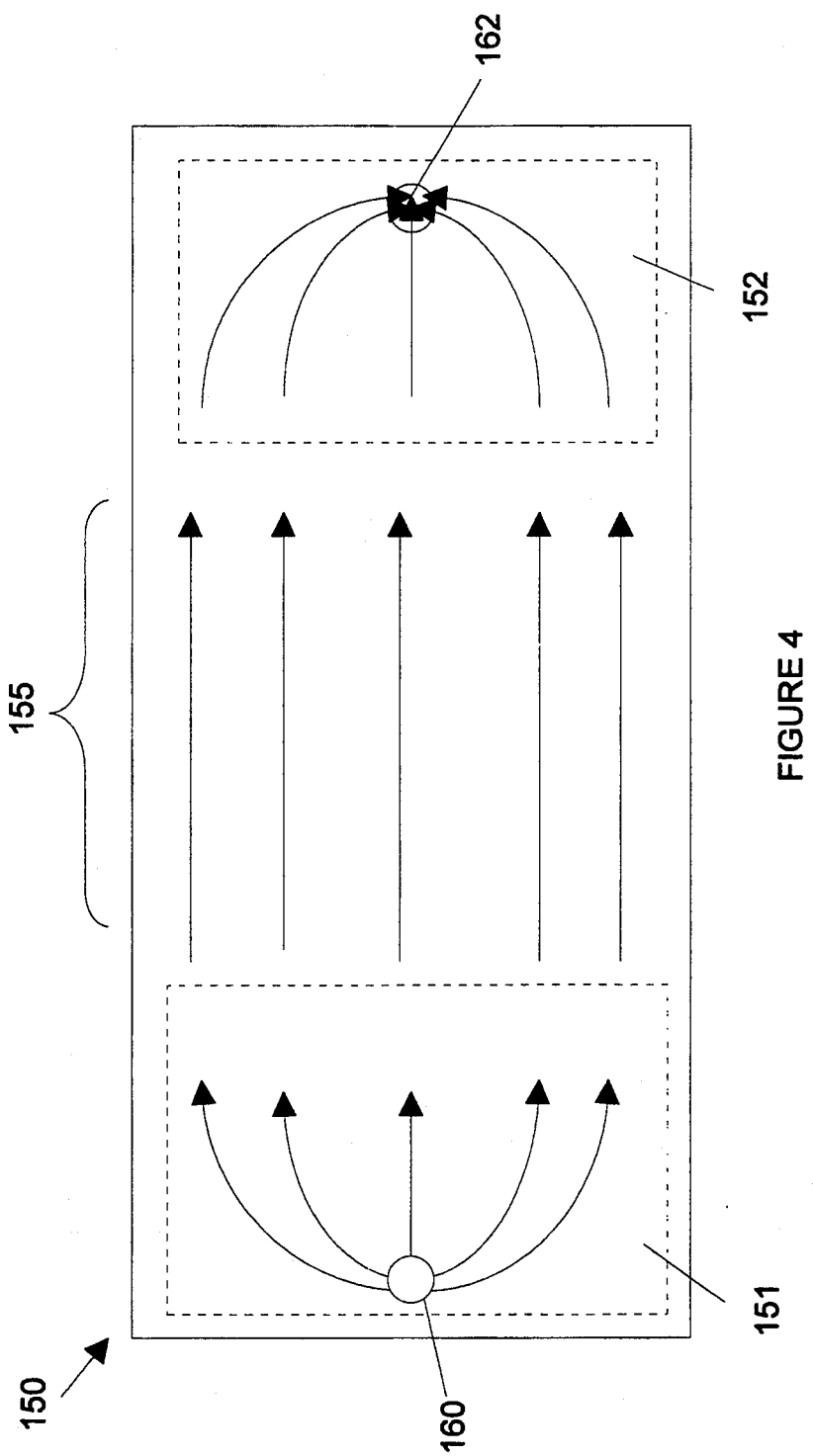
FIG. 4 is a top view of a cell having a more optimally defined electrochemical interaction zone.
Figure 5:
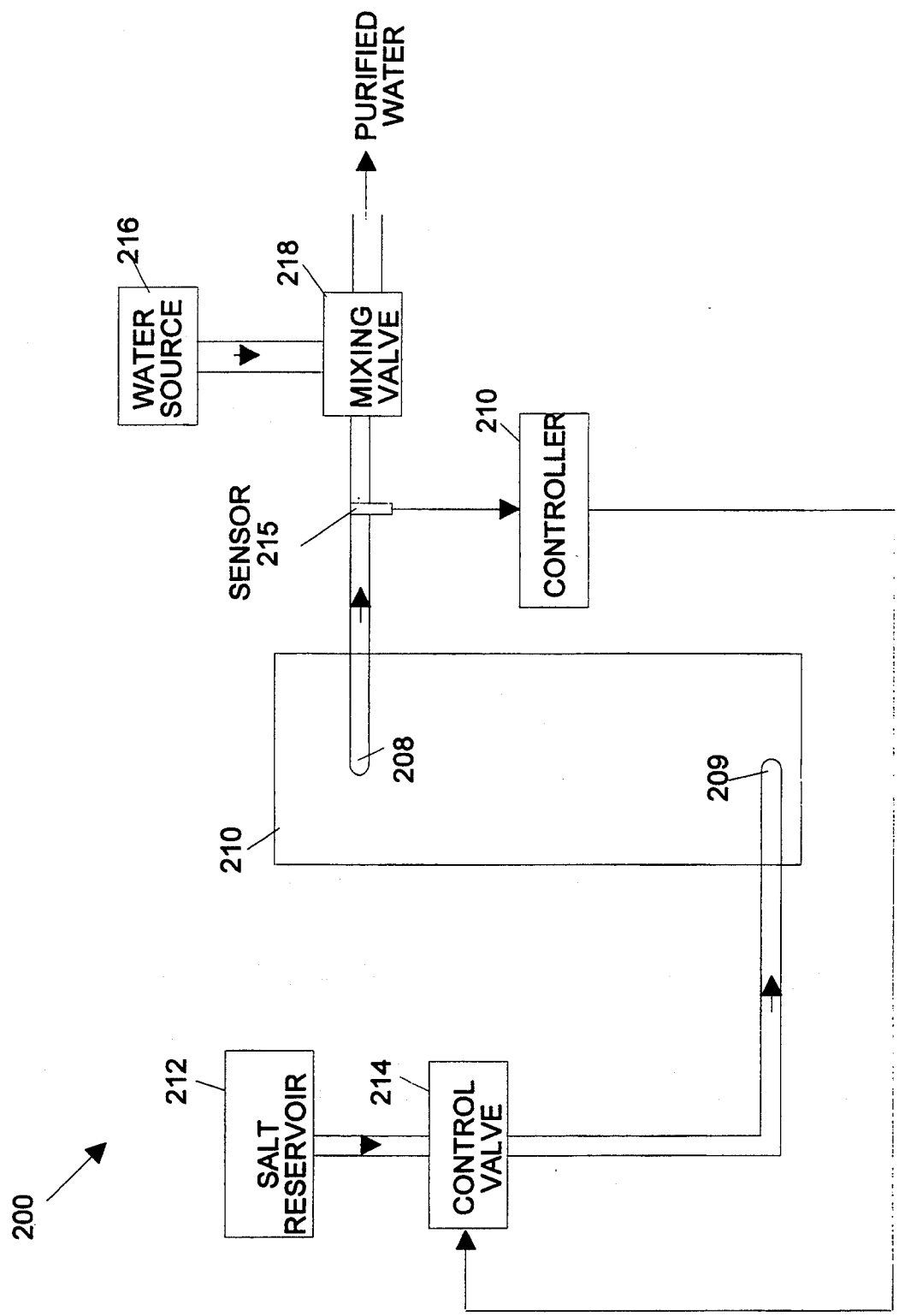
FIG. 5 is a block diagram of a water purification system according to the present invention.

In the preferred embodiment of the present invention, flow chamber 24 is substantially rectilinear in shape with small openings for input port 18 and output ports 20 and 22. Such cell designs are particularly easy to construct at minimal cost. In this case, the flow within the chamber itself is not rectilinear because of the need for the fluid to "fan-out" from the input port and be recollected at the output ports. A rectilinear flow region, can, however, be defined within this region by introducing a rectilinear insulator at the input end of the flow chamber. Such an arrangement is shown in FIG. 4 at 150. FIG. 4 is a top view of a flow cell according to the present invention illustrating the location and shape of two insulating members for limiting the electrochemical interaction area to those regions of the cell in which the flow is rectilinear. At the input end of the flow chamber the insulator 151 may be attached to the electrode which is opposite the input port 160. Insulator 151 serves the function of preventing current flow through the electrolyte in the region of the flow chamber at which the fluid is still fanning out. Insulator 152 is a separator analogous to separator 25 shown above. Insulator 152 divides the flow into anode and cathode streams and shields the portion of the flow in which the fluid is collected into the two streams from electrochemical interactions. The remaining region 155 is a region of parallel flow in which the transit time along all paths is essentially the same. This region is not shielded by the insulator; hence, the electrochemical reactions described above occur in this region.

Alternatively, the input insulator may be omitted and non-linearities introduced into the shape of separator 25 to assure that the fluid traversing the various portions of the boundary of separator 25 had spent equal time in contact with the anode surface. Alternative insulator designs which provide an electrochemical interaction region in which all portions of the electrolyte flow have the same residency time will be apparent to those skilled in the art.

The goal of the optimization process of the present invention is to assure that the various structural and operating parameters of electrolytic cell 10 are chosen such that the optimum pH range for ozone production occurs at the end of separator 25. This optimization may be accomplished by a servo mechanism that operates on any of a number of operating parameters. The preferred parameter is the flow rate of the salt solution through the cell which may be adjusted by adjusting the pressure of the salt solution at port 18. As the pressure is increased, the flow rate increases and the drop in pH between input port 18 and region 25 is decreased. Similarly, if the pressure is decreased, the salt solution will spend more time in contact with the anode which results in a decrease in the pH of the anode stream.

Alternatively, the voltage across electrolytic cell 10 may be adjusted to optimize the pH of the anode stream. At higher operating voltages, the rate of reaction also increases thereby reducing the pH of the anode stream. Unfortunately, increasing the operating voltage across electrolytic cell 10 results in other problems. In particular, the production of various gaseous products such as $H_2$ and $O_2$ increases with increased voltage. The $H_2$ poses an explosion hazard. In addition, these products are less efficient from a germicidal prospective. The rate at which the coatings on the inner surface of the anode are eroded also increases rapidly with increasing voltage; hence, the lifetime of the cell is significantly decreased if the operating voltage is increased. For these reasons, adjustment of operating voltage to obtain optimum pH in the anode stream is not preferred.

Similarly, the concentration of salt could be adjusted to optimize the anode stream pH. However, the equipment for providing variable mixing of solution is more complex, and hence, to be avoided.

As noted above, the amount of ozone produced is also determined by the coating material used on the anode. This coating material represents a significant portion of the cost of electrolytic cell 10; hence, it is advantageous to minimize the area that must be plated. The coated area may be minimized by limiting the Group VIII catalyst to region 27 shown in FIG. 3. This arrangement allows a significantly thicker coating to be provided for the same cost. As a result, an electrolytic cell with increased lifetime is obtained.

It has been found experimentally that the orientation of electrolytic cell 10 also effects the ozone content of the anode stream. In particular, if electrolytic cell 10 is mounted vertically with anode port 20 above input port 18, the concentration of ozone in the anode stream is significantly increased.

A block diagram of a water purification system 200 utilizing an electrolytic cell 210 according to the present invention is shown in FIG. 4. Electrolytic cell 210 is supplied with a brine solution from a salt reservoir 212 that provides brine at a pressure above some minimum design pressure. Reservoir 212 preferably includes a storage tank that is mounted at a fixed distance above electrolytic cell 210. However, it will be apparent to those skilled in the art that a tank and pump arrangement will also provide the required functionality. A control valve 214 is used to control the flow rate of the brine solution through electrolytic cell 210. Control valve 214 is operated by controller 210 which is connected to the output of sensor 215. Sensor 215 measures the ozone concentration in the anode stream leaving port 208 or some other parameter that is correlated with ozone concentration, e.g. pH. The anode stream is combined at a predetermined ratio with water from a drinking water source 216 to generate a purified water stream. This mixing is accomplished with the aid of mixing valve 218.

Accordingly, an improved apparatus for generating a mixed oxidant stream suitable for disinfecting water has been disclosed. Various modifications to the present invention will become apparent to those skilled in the art from the foregoing description and accompanying drawings. Accordingly, the present invention is to be limited solely by the scope of the following claims.

What is claimed is:

1. An apparatus for generating a mixed oxidant stream including ozone, said apparatus comprising:
   anode means comprising a first surface; cathode means comprising a second surface;
   means for maintaining an electrical potential between said first and second surfaces; and
   means for causing an electrolytic solution to flow between said first and second surfaces and to be subsequently divided into cathode and anode streams, said anode stream comprising the portion of said electrolytic solution that was caused to flow between said first and second surfaces adjacent to said first surface;
   means for defining a electrochemical interaction zone bounded by said first and second surfaces in which said electrolytic solution undergoes electrochemical interactions, wherein said electrolytic solution flows through said interaction zone in the same direction that bubbles generated on said first and second surfaces would travel in the absence of said flow of electrolytic solution.

* * * * *